United States Patent
Leynaud et al.

(10) Patent No.: US 11,168,582 B2
(45) Date of Patent: Nov. 9, 2021

(54) AIRCRAFT TURBOMACHINE COMPRISING DECOUPLING MEANS

(71) Applicant: SAFRAN AIRCRAFT ENGINES, Paris (FR)

(72) Inventors: Robin Leynaud, Paris (FR); Serge Benyamin, Paris (FR); Nicolas Perron, Paris (FR); Benjamin Petard, Paris (FR); Florian Poinsot-Berthelot, Samois sur Seine (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 301 days.

(21) Appl. No.: 16/421,124

(22) Filed: May 23, 2019

(65) Prior Publication Data

US 2020/0025024 A1 Jan. 23, 2020

(30) Foreign Application Priority Data

May 28, 2018 (FR) ...................................... 1854536

(51) Int. Cl.
*F01D 21/04* (2006.01)

(52) U.S. Cl.
CPC ...... *F01D 21/045* (2013.01); *F05D 2220/323* (2013.01)

(58) Field of Classification Search
CPC .................................................... F01D 21/045
USPC ............................................................ 415/9
See application file for complete search history.

(56) References Cited

U.S. PATENT DOCUMENTS

| 7,316,538 B2 * | 1/2008 | Bouchy | F01D 21/045 |
| | | | 411/916 |
| 2014/0119893 A1 * | 5/2014 | Servant | F02K 3/06 |
| | | | 415/123 |

FOREIGN PATENT DOCUMENTS

| EP | 1308602 A1 | 5/2003 |
| EP | 1403468 A1 | 3/2004 |
| EP | 1439316 A2 | 7/2004 |
| EP | 1653051 A1 | 5/2006 |
| EP | 2721260 A1 | 4/2014 |
| EP | 3205840 A1 | 8/2017 |

(Continued)

OTHER PUBLICATIONS

Preliminary Research Report and Written Opinion received for French Application No. 1854536, dated Feb. 1, 2019, 8 pages (1 page of French Translation Cover Sheet and 7 pages of original document).

*Primary Examiner* — Michael L Sehn
(74) *Attorney, Agent, or Firm* — Womble Bond Dickinson (US) LLP

(57) ABSTRACT

An aircraft turbomachine (10) comprising a gas generator (12) and a fan (14) located upstream of the gas generator and surrounded by a fan casing (16), the gas generator comprising a high-pressure body (12*b*) and a low-pressure body (12*a*) which is connected to a shaft of the fan (32), the high- and low-pressure bodies comprising compressors (22, 20) between which is located an intermediate casing (40) which connects the gas generator to said fan casing, the turbomachine further comprising first decoupling means (60) configured to disconnect the fan shaft from the low-pressure body, following a detection of a critical event, characterised in that it comprises second decoupling means configured to disconnect a blades stator from the compressor of the low-pressure body opposite the intermediate casing, these (Continued)

second fixing means comprising fusible means (62) for fixing the bladed stator to the intermediate casing.

12 Claims, 2 Drawing Sheets

(56) References Cited

FOREIGN PATENT DOCUMENTS

| | | | |
|---|---|---|---|
| FR | 2965298 | A1 | 3/2012 |
| FR | 3006713 | A1 | 12/2014 |
| WO | 2012/175864 | A1 | 12/2012 |

* cited by examiner

AIRCRAFT TURBOMACHINE COMPRISING DECOUPLING MEANS

TECHNICAL FIELD

The present invention relates to an aircraft turbomachine comprising decoupling means.

STATE OF THE ART

The state of the art comprises, in particular, documents FR-A1-3 006 713, EP-A1-1 653 051, FR-A1-2 965 298, EP-A1-3 205 840, EP-A1-1403468, EP-A1-1439316, EP-A1-1308602 and EP-A1-2721260.

Conventionally, a turbomachine comprises a gas generator and a fan located at an end of the gas generator surrounded by a fan casing. The fan is intended to generate an airflow, of which one portion supplies the gas generator and forms a primary flow, and another portion flows between the gas generator and the fan casing and forms a secondary airflow which generates a main portion of the thrust of the turbomachine.

The gas generator comprises, from upstream to downstream in the direction of flow of the gases, at least one compressor, a combustion chamber and at least one turbine. The role of the compressor is to increase the air pressure supplied to the combustion chamber. The role of the turbine is to ensure the driving in rotation of the compressor by removing some of the energy of pressure from the hot gases exiting the combustion chamber and by transforming it into mechanical energy.

The compressor and the turbine consist of a first set of fixed parts constituting the stator and a second set of parts, able to be rotated with respect to the stator, constituting the rotor.

The rotor of the compressor and the rotor of the turbine form an assembly securely connected by a rotating shaft. The rotation of the rotor with respect to the stator is made possible by means of bearings, one bearing being a mechanical member supporting and guiding a rotor, in particular the shaft of this rotor. This bearing comprises a first portion fixed to the rotor shaft and a second portion fixed to the stator by way of a bearing support. A bearing is arranged between the two portions of the bearing, thus enabling the rotation of a portion of the bearing with respect to the other. The bearing can, for example, be of the ball, cylindrical roller or tapered roller type.

A turbomachine can also be of the "double-body" type, which means that it comprises two rotors arranged coaxially, a bearing enabling the relative rotation between these two rotors. A first body is called "low-pressure body" and a second body is called "high-pressure body". In a known manner, the gas generator comprises, in this case, from upstream to downstream, a low-pressure compressor, a high-pressure compressor, the combustion chamber, a high-pressure turbine and a low-pressure turbine.

An intermediate casing is located between the low- and high-pressure compressors and structurally connects the gas generator to the fan casing. It generally comprises an annular row of radially internal arms, extending into the primary flow, between the ducts of the low- and high-pressure compressors, and an annular row of radially external arms, extending into the secondary flow. The low-pressure body is guided upstream by bearings of which the supports are fixed to the intermediate casing.

The fan comprises very large blades, called fan blades, of which one of the effects is to increase the mass and the inertia of the low-pressure body.

In case of rupture of a fan blade, an imbalance is produced on the fan shaft. An imbalance is a phenomenon of unbalance of the rotor, of which the centre of gravity is no longer located precisely on the axis of rotation as it should be. Cyclical loads and significant vibrations are thus communicated to the stator of the turbomachine, by way of bearing supports, with significant risks of damage, which could lead to the self-destruction thereof. To avoid the transmission of these undesirable phenomena to the stator, it is necessary to decouple the bearing supports, i.e. to interrupt the mechanical transmission of the rotation, in particular, by disconnecting the bearing supports from the intermediate casing.

A solution is known, consisting of using fusible screws for fixing an upstream portion and a downstream portion, or an outer portion and an inner portion, forming a bearing support. These fusible screws have a reduced cross-sectional portion likely to be broken beyond a predetermined traction force and thus achieve the decoupling of the two portions constituting the bearing support.

For a turbomachine equipped with such fusible screws, a loss of fan blade is marked by two major critical moments during which strong loads travel through the structures of the gas generator of the suspended pylon of the turbomachine to the aircraft, and of the nacelle extending around the fan casing:
- the impact of the blade on the fan casing, and
- the passing of the mode of the low-pressure body during the deceleration of the rotor.

In addition to the fusible screws for decoupling the bearing supports, it is known to provide a buckling of the blades of the low-pressure compressor during the loss of a fan blade. These blades are indeed designed to buckle from a certain contact load between the rotor and the stator of the low-pressure compressor. The buckling of the blades limits the rotor-stator contacts in this compressor and makes it possible to lower the position of the shaft mode.

However, the Applicant has observed that significant contacts remain between the rotor and the stator during the deceleration of the rotor. These contacts tend to rigidify the rotor line and thus increase the frequency of the mode of the low-pressure body.

The present invention proposes an improvement to this technology, which is, in particular, effective and economical, and makes it possible to reduce the loads induced by the passing of this mode.

DESCRIPTION OF THE INVENTION

The invention proposes an aircraft turbomachine, comprising a gas generator and a fan located upstream of the gas generator and surrounded by a fan casing, the gas generator comprising a high-pressure body and a low-pressure body which is connected to a shaft of the fan, the high-pressure and low-pressure bodies comprising compressors between which is located an intermediate casing which connects the gas generator to said fan casing, the turbomachine further comprising first decoupling means, configured to disconnect the fan shaft from the low-pressure body following a detection of a critical event, characterised in that it comprises second decoupling means to disconnect a bladed stator from the compressor of the low-pressure body opposite the intermediate casing, these second fixing means comprising fusible means for fixing the bladed stator to the intermediate casing.

The invention thus proposes a solution making it possible to suppress the rotor-stator contact rigidity at the level of the low-pressure compressor during the appearance of the critical event, namely, for example, the loss of a fan blade. The direct impact of the measure is quantified by reducing motor loads during this event.

The present invention is different from the state of the art, in particular by the positioning of the zone for installing the decoupling means. Here, which is, for example, sought, is the decoupling between a casing of the low-pressure compressor and the intermediate casing, and not the decoupling at the level of bearings (which however constitutes a complementary solution).

The turbomachine according to the invention can comprise one or more of the following characteristics, taken individually from one another, or in combination with one another:

- the compressor of the low-pressure body comprises several compression stages, at least one of these stages comprising an annular row of fixed blades and an annular row of mobile blades, the annular rows of fixed blades being carried by the bladed stator which is fixed to the intermediate casing by said fusible means;
- said fusible means comprise at least one annular row of fusible screws, which are distributed about a longitudinal axis of the turbomachine, and which extend substantially parallel to this axis;
- the fusible screws pass through a substantially radial annular flange of said stator and a substantially radial annular wall of said intermediate casing, the fusible screws being configured to axially clamp the flange and the wall together;
- the fusible screws are axially engaged from upstream in the orifices of the flange and of the wall, the fusible screws comprising heads intended to abut onto an upstream radial face of said flange;
- the heads of the fusible screws are housed in an annular cage carried by and/or formed on said wall, the cage being configured to retain the screw heads in case of decoupling said stator of said intermediate casing;
- said cage comprises a first annular member with an L-, C- or U-shaped axial cross-section, which is secured to said wall and which extends radially inside said flange which is at least partially engaged in an annular opening defined by said first member and opening radially towards the outside;
- said cage comprises a second annular member with an L-, C- or U-shaped axial cross-section, which is secured to said wall and which extends radially outside of said flange, this second member being configured to extend upstream from said screw heads, as well as radially inside and outside of these;
- at least one of said first and second members is returned and fixed to said wall; and
- at least one of said first and second members is formed of a single part with said wall.

DESCRIPTION OF THE FIGURES

The invention will be best understood and other details, characteristics and advantages of the invention will appear upon reading the following description, given as a non-limiting example, in reference to the appended drawings, wherein.

DETAILED DESCRIPTION

Figure 1:
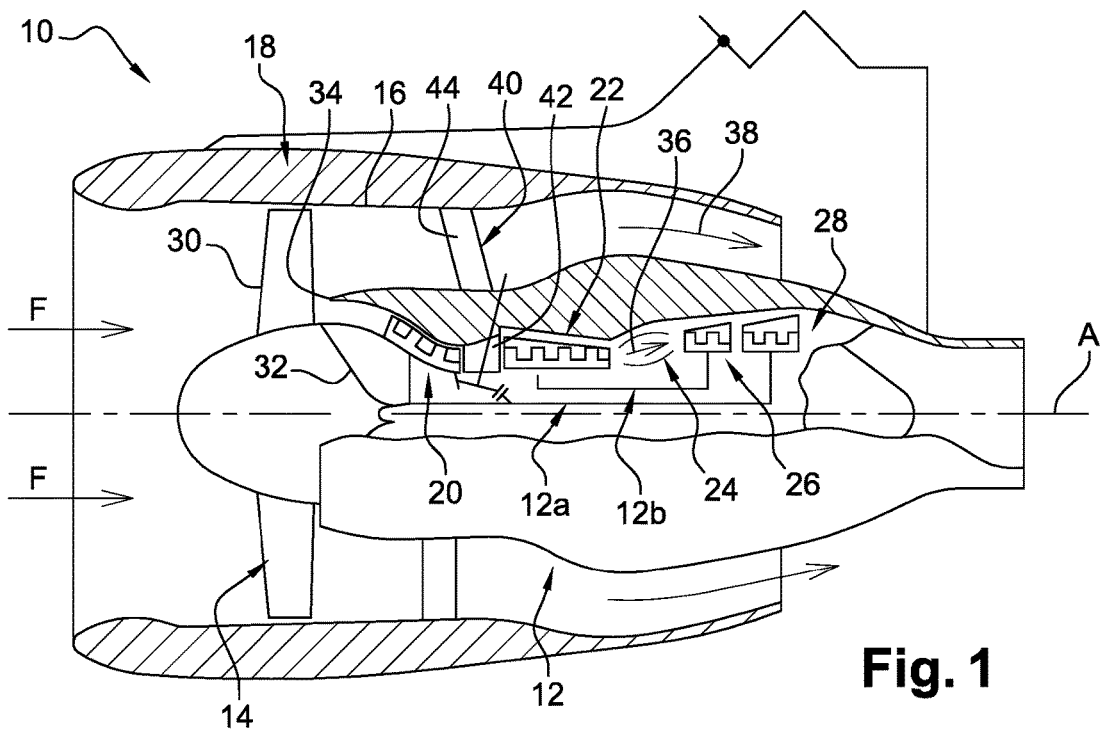
FIG. 1 is a schematic, axial, cross-sectional view of an aircraft turbomachine.
Figure 2:
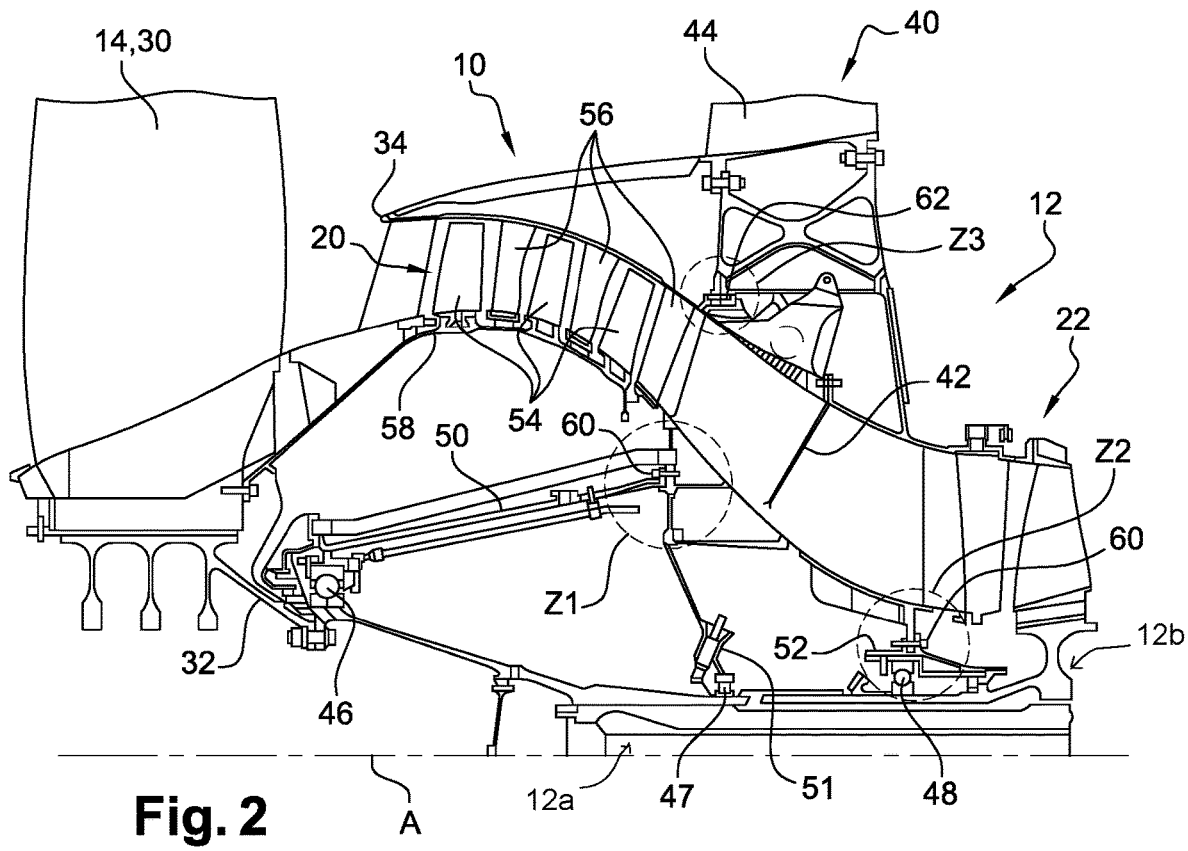
FIG. 2 is a schematic, partial, cross-sectional view of an aircraft turbomachine.

First, FIGS. 1 and 2 are referred to, which schematically represent a double-body and bypass aircraft turbomachine 10.

The turbomachine 10 conventionally comprises a gas generator 12 upstream from which is arranged a fan 14. The fan 14 is surrounded by a fan casing 16, which forms part of a nacelle 18 which extends around and along a large portion of the gas generator 12.

The gas generator 12 here comprises two bodies, namely a low-pressure body 12a and a high-pressure body 12b. Each body comprises a compressor and a turbine.

The terms "upstream" and "downstream" are considered along a main direction F of flow of gases in the turbomachine 10, this direction F being parallel to the longitudinal axis A of the turbomachine.

From upstream to downstream, the gas generator 12 comprises a low-pressure compressor 20, a high-pressure compressor 22, a combustion chamber 24, a high-pressure turbine 26 and a low-pressure turbine 28.

The fan 14 comprises an annular row of blades 30 driven in rotation by a fan shaft 32 connected to the rotor of the low-pressure body 12a. The gas flow which passes through the fan (arrow F) is separated upstream of the gas generator 12 by an annular lip 34 into a radially internal annular flow, called primary flow 36, which supplies the gas generator 12, and into a radially external annular flow, called secondary flow 38 which flows between the gas generator 12 and the nacelle 18 and supplies most of the thrust of the turbomachine.

An intermediate casing 40 is located between the low- and high-pressure compressors 20, 22 and structurally connects the gas generator 12 to the fan casing 16 and to the nacelle 18. The intermediate casing 40 comprises an annular row of radially internal arms 42 extending into the primary flow 36, between the ducts of the low- and high-pressure compressors 20, 22, and an annular row of radially external arms 44 extending into the secondary flow 38. There is generally a limited number of arms 42 (less than ten) and are tubular and passed through by services.

As can be seen in FIG. 2, the rotor of the low-pressure body 12a, as well as the fan shaft 32, are guided by bearings 46, 47. The bearing 46 is of the ball type, and the bearing 47 is of the roller type. These bearings 46, 47 each comprise an inner ring, mounted on the shaft to be guided, an outer ring carried by a bearing support 50, 51, and a bearing between the rings.

The rotor of the high-pressure body 12b is guided by a bearing 48 which is of the ball type, and which comprises an inner ring mounted on the shaft to be guided, an outer ring carried by a bearing support 52, and a bearing between the rings.

The supports 50, 51, 52 for the bearings are fixed parts connected to the stator and here, in particular, to the intermediate casing 40.

As can also be seen in FIG. 2, the low-pressure compressor 20 comprises several compression stages (for example, a number of stages of between two and five, and for example, three) of which at least one, and preferably each of them, comprises an annular row of stator fixed blades 56, called rectifiers, and an annular row of rotor mobile blades 54. Preferably, each compression stage comprises an annular row of stator fixed blades 56, called rectifiers, and an annular row of rotor mobile blades 54. Preferably, the row of stator fixed blades, and the row of rotor mobile blades of the same stage are axially adjacent.

The mobile blades 54 are carried by a common drum 58 which is secured to the fan shaft 32. The fixed blades 56 are secured together and fixed to the intermediate casing 40.

As stated above, in case of rupture of a fan blade 30, an imbalance is produced on the fan shaft 32, and the turbomachine is equipped with decoupling means which are intended to limit the effects of this imbalance on the remainder of the turbomachine.

These decoupling means generally comprise fusible screws 60 arranged in the zone Z1 of FIG. 2, namely on the zone for fixing the bearing support 50, 51 to the intermediate casing 40. The zone Z2 is a zone for fixing the bearing support 52 to the intermediate casing 40.

The Applicant has observed that, in case of loss of a fan blade 30, significant contacts remain between the rotor and the stator during of the compressor 20 during the deceleration of the rotor. These contacts tend to rigidify the rotor line and increase the frequency of the mode of the low-pressure body 12*a*.

The invention proposes decoupling means, which can be combined with the decoupling means of the prior art, and which make it possible to obtain a significant contact rigidity at the level of the low-pressure compressor 20.

The invention thus proposes to break, for example in the zone Z3, the connection between the bladed stator of the low-pressure compressor 20 and the intermediate casing 40 using fusible screws 62, capable of breaking by traction under the sharp force induced by the contacts of the rotor on the stator. The stator of the compressor 20 is called "bladed stator" insofar as it is secured to blades, or it carries blades.

The decoupling will not prevent contacts between the rotor and stator, but with the force path being cut, the contact rigidity will be marginal and the loads increasing through the bearings 46, 47 will decrease.

Figure 3:
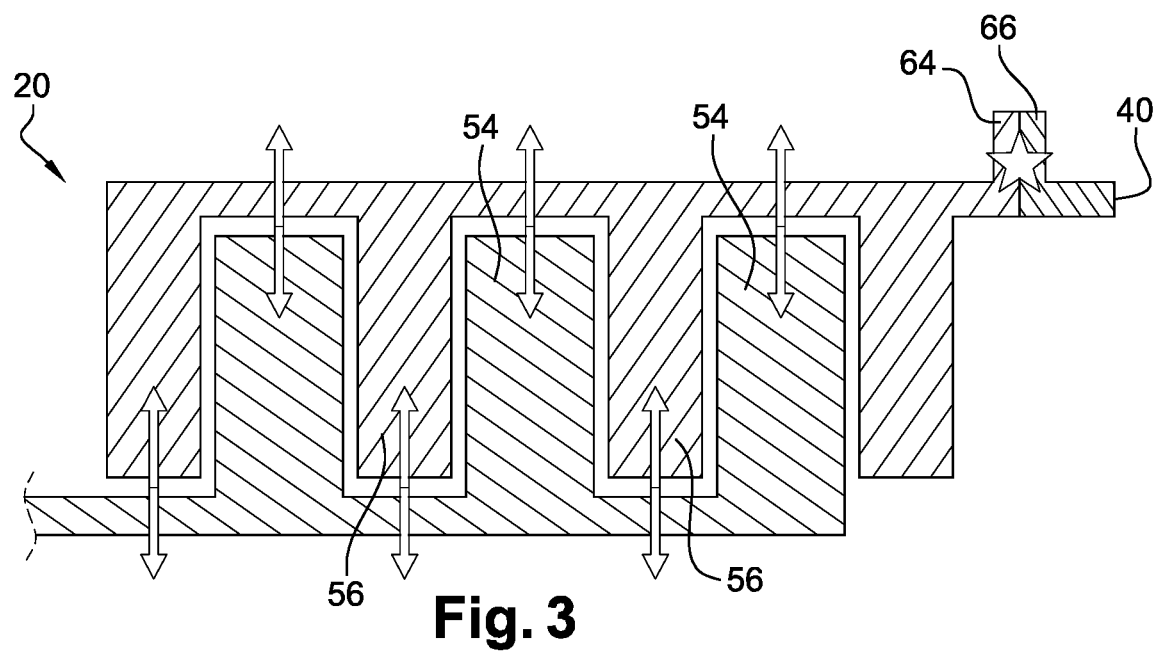
FIG. 3 is a very schematic, partial, cross-sectional view of a low-pressure compressor and or an intermediate casing of an aircraft turbomachine according to the invention.

FIG. 3 very schematically shows a low-pressure compressor 20 with the rotor blades 52 thereof and the stator blades 56 thereof, the latter being connected together and fixed by way of an annular flange 64 to a wall 66 of the intermediate casing 40. The doubles arrows show the risks of contact between the rotor and the stator of the compressor. The star shows the zone for installing the fusible screws 62, i.e. the decoupling zone under a sharp force.

Figure 4:
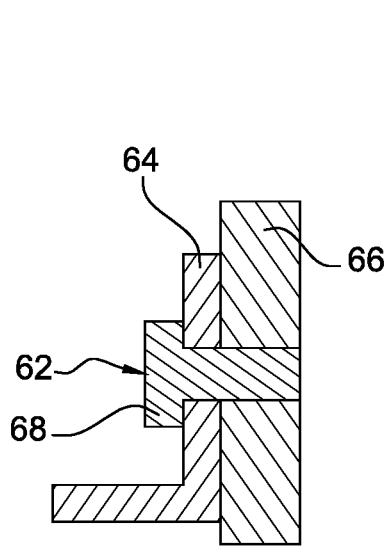
FIG. 4 is a schematic, partial, axial, cross-sectional view of means for fixing a low-pressure compressor stator to an intermediate casing.

As is schematically represented in FIG. 4, the decoupling means can be summarised as an annular row of fusible screws 62. In the example represented, the screws 62 are distributed about the longitudinal axis of the turbomachine and extend substantially parallel to this axis. The fusible screws 62 pass through the orifices of the flange 64, as well as the aligned orifices of the wall 66. The screws 62 are configured to axially clamp the flange and the wall against one another. The screws here are axially engaged from upstream into the orifices of the flange and of the wall, the fusible screws 62 comprising heads 68 intended to abut onto an upstream radial face of the flange 64.

In case of rupture of a screw 62, it will be split into two pieces, one of which should comprise the head 68. The screw piece comprising the head should be disconnected from the assembly, while the remainder of the screw could remain screwed into the orifice of the wall 66 of the intermediate casing 40.

Figure 5:
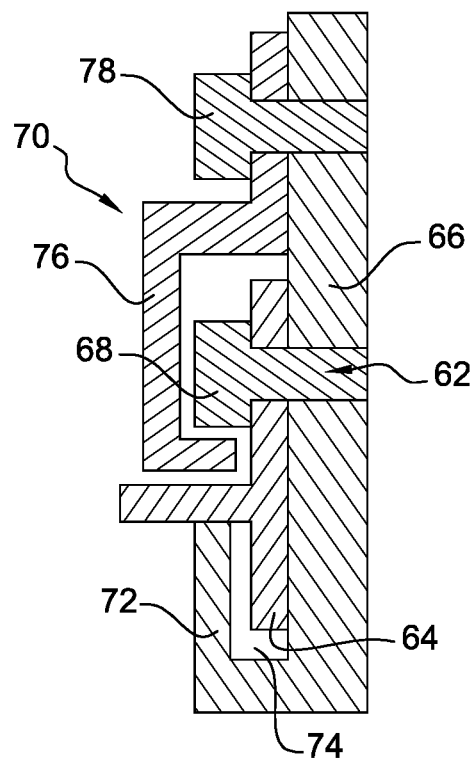
FIG. 5 is a schematic, partial, axial, cross-sectional view of improved means for fixing a low-pressure compressor stator to an intermediate casing.

To avoid the loss of the piece comprising the head 68, the embodiment of FIG. 5 proposes to provide a cage 70 around the screw heads 68.

In the example represented, the heads 68 of the fusible screws 62 are housed in an annular cage 70 partially carried by the wall 66 and partially formed on this wall.

The cage 70 comprises a first annular member 72 with an L-, C- or U-shaped axial cross-section, which is secured to the wall 66 and which extends radially inside the flange 64. The flange is at least partially engaged in an annular opening 74 defined by the first member 72 and opening radially towards the outside. The first member 72 is here formed of one single part with the wall 66.

The cage 70 comprises a second annular member 76 with an L-, C- or U-shaped axial cross-section, which is secured to the wall 66 and which extends radially outside of the flange 64. This second member 76 is configured to extend upstream of the screw heads 68, as well as radially inside and outside of them. The second member 76 is here returned and fixed onto the wall 66, here by means of non-fusible screws 78. The number of screws 78 is preferably less than the number of screws 68. The screws 78 can be replaced by other fixing means, like clips, as the second member 76 only forms a cover.

These cage decoupling means make it possible:
- to prevent the casing of the low-pressure compressor 20 from "falling", due to the disconnection thereof with the intermediate casing 40; the geometry of the cage 70 indeed makes it possible for a radial and axial retention of the casing, once it is uncoupled;
- to guarantee an almost-nominal positioning of this casing, while making it possible for it to be moved during rotor/stator contacts; the retaining of the positioning of the casing also makes it possible to not disturb the flow of the secondary flow;
- to contain the decoupled screw heads 68;
- a clearance between the cage and the casing of the low-pressure compressor makes it possible for the latter to oscillate in a restricted manner after decoupling.

In the state of the art, the blades of the low-pressure compressor are designed with the constraint of having to buckle from a certain load. With the present invention, this constraint disappears and opens the path to using other materials for these blades.

This innovation makes it possible to reduce the loads passing through into the motor structures during an event of fan blade loss, which is one of the cases of the main sizing of an aircraft turbomachine. This load decrease makes it possible to optimise the motor architecture to alleviate it, and to thus make it more efficient.

The invention claimed is:

1. An aircraft turbomachine, comprising a gas generator and a fan located upstream of the gas generator and surrounded by a fan casing, the gas generator comprising a high-pressure body and a low-pressure body which is connected to a shaft of the fan, the high- and low-pressure bodies comprising compressors between which an intermediate casing is located, which connects the gas generator to said fan casing, the turbomachine further comprising first decoupling means configured to disconnect the fan shaft from the low-pressure body following a detection of a critical event, wherein the aircraft turbomachine further comprises second decoupling means configured to disconnect a bladed stator from the compressor of the low-pressure body opposite the intermediate casing, said second decoupling means comprising fusible means for fixing the bladed stator to the intermediate casing.

2. The aircraft turbomachine according to claim 1, wherein the compressor of the low-pressure body comprises several compression stages, at least one of the stages comprising an annular row of fixed blades and an annular row of mobile blades, the annular rows of fixed blades being carried by the bladed stator which is fixed to the intermediate casing by said fusible means.

3. The aircraft turbomachine according to claim 1, wherein said fusible means comprise at least one annular row of fusible screws which are distributed about a longitudinal axis of the turbomachine and which extend substantially parallel to said longitudinal axis.

4. The aircraft turbomachine according to claim 3, wherein said at least one annular row of fusible screws pass through a substantially radial annular flange of said bladed stator and a substantially radial annular wall of said intermediate casing, said at least one annular row of fusible screws being configured to axially clamp the flange and the wall together.

5. The aircraft turbomachine according to claim 4, wherein said at least one annular row of fusible screws are axially engaged from upstream into orifices of the flange and of the wall, said at least one annular row of fusible screws comprising heads for abutting onto an upstream radial face of said flange.

6. The aircraft turbomachine according to claim 5, wherein the heads of said at least one annular row of fusible screws are housed in an annular cage carried by and/or formed on said wall, the annular cage being configured to retain the heads of said at least one annular row of fusible screws, in case of decoupling of said bladed stator from said intermediate casing.

7. The aircraft turbomachine according to claim 6, wherein said annular cage comprises a second annular member with an L-, C- or U-shaped axial cross-section, which is secured to said wall and which extends radially outside of said flange, said second annular member being configured to extend upstream from the heads of said at least one annular row of fusible screws, as well as radially inside and outside of said heads.

8. The aircraft turbomachine according to claim 7, wherein said second annular member is returned and fixed onto said wall.

9. The aircraft turbomachine according to claim 7, wherein said second annular member is formed of a single part with said wall.

10. The aircraft turbomachine according to claim 6, wherein said annular cage comprises a first annular member with an L-, C- or U-shaped axial cross-section, which is secured to said wall and which extends radially inside said flange, which is at least partially engaged in an annular opening defined by said first annular member and opening radially outwardly.

11. The aircraft turbomachine according to claim 10, wherein said first annular member is returned and fixed onto said wall.

12. The aircraft turbomachine according to claim 10, wherein said first annular member is formed of a single part with said wall.

* * * * *